United States Patent
Abby et al.

(10) Patent No.: US 9,581,782 B2
(45) Date of Patent: Feb. 28, 2017

(54) CABLE MANAGEMENT SPOOL MOUNTING ASSEMBLY

(71) Applicant: HUBBELL INCORPORATED, Shelton, CT (US)

(72) Inventors: Marjana M. Abby, Carolina, RI (US); Richard J. Merrell, New Haven, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/837,559

(22) Filed: Aug. 27, 2015

(65) Prior Publication Data

US 2016/0061354 A1 Mar. 3, 2016

Related U.S. Application Data

(60) Provisional application No. 62/042,951, filed on Aug. 28, 2014.

(51) Int. Cl.
| | |
|---|---|
| *F16L 3/00* | (2006.01) |
| *G02B 6/44* | (2006.01) |
| *H02G 11/02* | (2006.01) |
| *H04Q 1/06* | (2006.01) |
| *B65H 75/36* | (2006.01) |
| *B65H 75/44* | (2006.01) |

(52) U.S. Cl.
CPC ........... *G02B 6/4457* (2013.01); *B65H 75/366* (2013.01); *B65H 75/446* (2013.01); *H04Q 1/062* (2013.01); *H04Q 1/064* (2013.01); *B65H 2701/32* (2013.01); *B65H 2701/34* (2013.01)

(58) Field of Classification Search
CPC ........ H04Q 1/062; H04Q 1/064; H04Q 1/066; H04Q 1/068; G02B 6/4457; B65H 75/446; B65H 75/366; B65H 2701/32; B65H 2701/34
See application file for complete search history.

(56) References Cited

U.S. PATENT DOCUMENTS

| | | | | |
|---|---|---|---|---|
| 3,154,281 | A * | 10/1964 | Frank ...................... | F16B 21/06 174/138 G |
| 3,255,987 | A * | 6/1966 | Gatch ..................... | F16B 21/02 108/156 |
| 3,303,937 | A * | 2/1967 | McConnell ............ | A47B 57/50 211/187 |
| 3,944,176 | A * | 3/1976 | Danko ................... | H04Q 1/142 174/72 A |

(Continued)

*Primary Examiner* — Stanton L Krycinski
(74) *Attorney, Agent, or Firm* — Dickinson Wright PLLC

(57) ABSTRACT

A spool assembly and a cable management assembly are provided for supporting cables in a rack or housing. A mounting member is provided having a spool opening for receiving a spool. The spool opening has a longitudinal dimension and a transverse dimension where the longitudinal dimension is greater than the transverse dimension. A detent extends from a longitudinal side edge of the spool opening toward a second longitudinal side edge of the spool opening to define a first open portion and a second open portion. In one embodiment, the first open portion and second open portion can be substantially same size and have a substantially circular configuration. In another embodiment, the first open portion can have a dimension greater than a dimension of the second open portion.

20 Claims, 7 Drawing Sheets

(56) References Cited

U.S. PATENT DOCUMENTS

| | | | | |
|---|---|---|---|---|
| 3,986,318 | A | * | 10/1976 | McConnell ............ F16B 12/34 211/192 |
| 4,106,630 | A | * | 8/1978 | Rosenband ............ A47B 57/22 211/191 |
| D257,950 | S | * | 1/1981 | Van Meter, Jr. ............. D13/154 |
| D293,205 | S | * | 12/1987 | Nakano ............................ D8/382 |
| 4,860,905 | A | * | 8/1989 | Schott ................... A47F 5/0823 211/59.1 |
| 5,174,675 | A | * | 12/1992 | Martin ................. B66B 13/303 187/333 |
| D347,687 | S | * | 6/1994 | Katzer ........................... D24/129 |
| 5,967,468 | A | * | 10/1999 | Veghte ..................... F16B 2/22 248/71 |
| 6,161,804 | A | * | 12/2000 | Paske ........................ F16L 3/12 248/71 |
| 6,439,523 | B1 | * | 8/2002 | Chandler, Jr. ....... G02B 6/4452 211/189 |
| 6,510,955 | B2 | * | 1/2003 | Pellegrino ............ F16B 7/0446 211/192 |
| 6,600,107 | B1 | * | 7/2003 | Wright ................... H02B 1/202 174/101 |
| 7,083,051 | B2 | * | 8/2006 | Smith ................... G02B 6/4452 211/26 |
| 7,331,473 | B2 | * | 2/2008 | Smith ................... G02B 6/4452 211/26 |
| 7,431,610 | B2 | * | 10/2008 | Laursen ................ H04Q 1/064 211/26 |
| 7,600,720 | B2 | * | 10/2009 | Vogel ................... H05K 7/1491 248/49 |
| 7,677,400 | B2 | * | 3/2010 | Bayazit ................ G02B 6/4452 211/26 |
| 7,764,857 | B2 | * | 7/2010 | Sjodin ................. G02B 6/4471 174/535 |
| 7,931,159 | B2 | * | 4/2011 | Kao ........................ B25H 3/04 211/70.6 |
| 8,003,890 | B2 | | 8/2011 | Donowho et al. |
| 8,042,699 | B2 | * | 10/2011 | Leichter ............... G02B 6/4457 211/26.2 |
| 8,459,472 | B2 | * | 6/2013 | Hofman ................ A47F 5/0815 211/106.01 |
| 8,899,424 | B2 | * | 12/2014 | Bayazit ................ G02B 6/4452 211/26 |
| 2004/0011547 | A1 | * | 1/2004 | Wright .................... H04Q 1/09 174/50 |
| 2004/0094491 | A1 | * | 5/2004 | Smith ................... G02B 6/4452 211/26 |
| 2006/0171651 | A1 | * | 8/2006 | Laursen ................ H04Q 1/064 385/135 |

\* cited by examiner

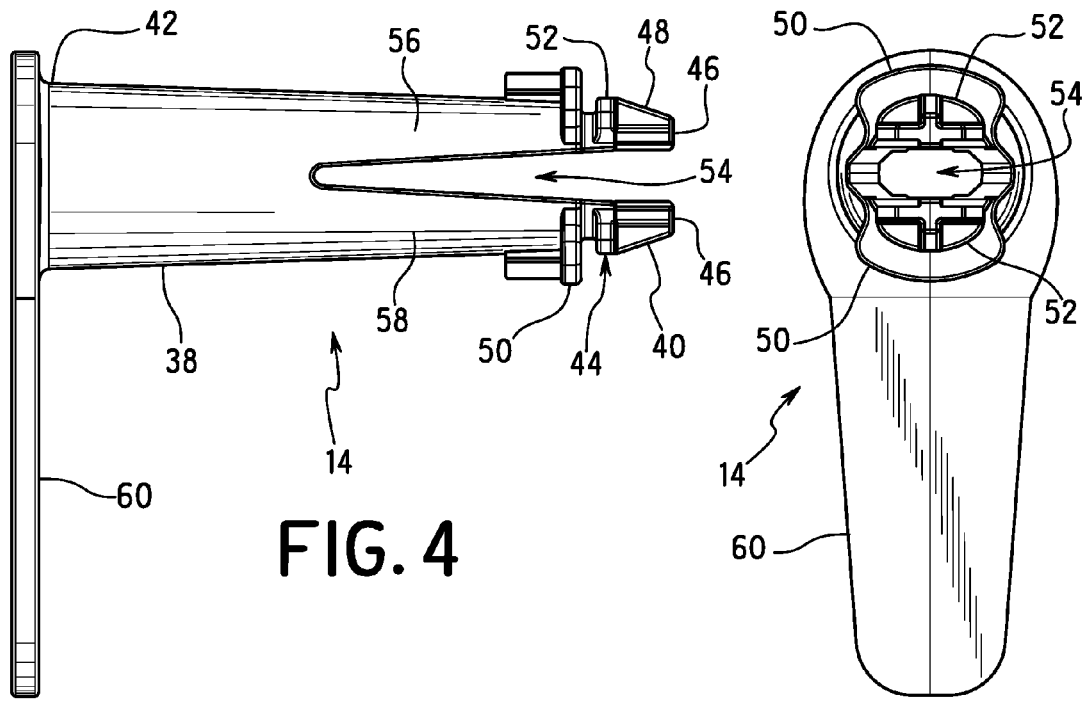
FIG. 4
FIG. 5
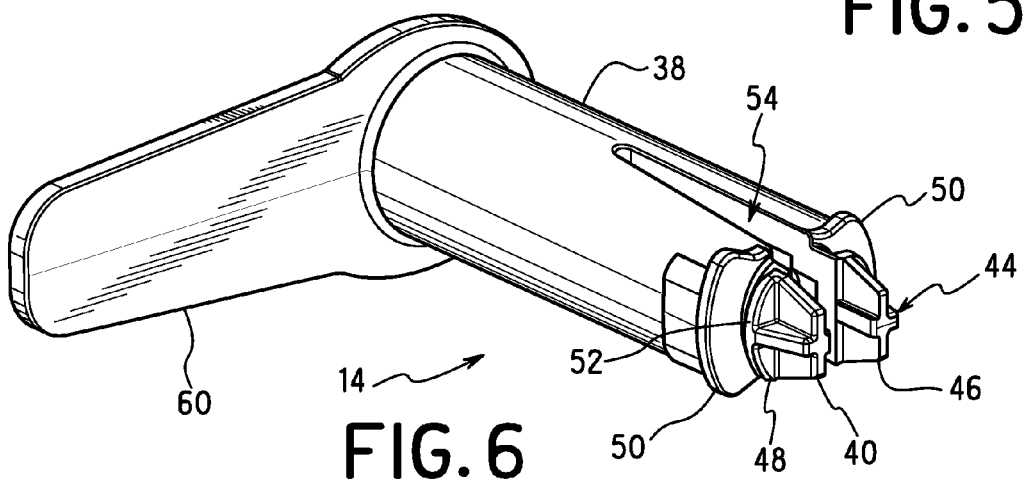
FIG. 6
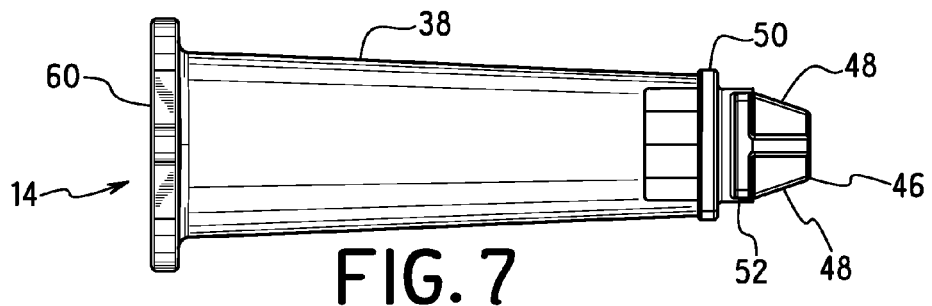
FIG. 7

CABLE MANAGEMENT SPOOL MOUNTING ASSEMBLY

CROSS-REFERENCE TO RELATED APPLICATION

This application claims priority to U.S. Provisional Patent Application No. 62/042,951 filed Aug. 28, 2014 which is hereby incorporated by reference in its entirety.

FIELD OF THE INVENTION

The present invention is directed to a cable management system for supporting and guiding cables in a rack or housing. The invention is particularly directed to a removable spool that can be attached easily to the rack in various locations, where the position of the spool can be moved to different location on the rack.

BACKGROUND OF THE INVENTION

Relay racks provide an efficient method of providing structure for a variety of cross-connect applications. The racks are typically used in a termination closet for the management of wiring systems such as telecommunication wiring systems and computer systems. Employing a channel in conjunction with the relay rack facilitates the handling, routing, and organizing of wires, such as cables and optical fibers.

Current cable management assemblies include channels that are mounted on the sides of the relay rack. The channels hold bundles of wires that are connected to various cross-connect products held within the center of the relay rack. The channels are mounted by using nut and bolt type fasteners to couple the relay rack to the channels. In addition, nut and bolt type fasteners are commonly used to make any attachments to the channels, such as for securing covers over the front compartments of the channels. The nut and bolt type fasteners to secure the channels and the covers increases costs and creates inefficiency in securing and using the channels.

The construction of the current channels can result in the channels breaking during shipping and storage because they are not sufficiently durable. The construction of the channel hinders loading and accessing wires in the front and rear compartments of the channel.

The current channels do not provide efficient securing and organizing the numerous wires, making it difficult for an operator to access the wires and the cross-connect products on the rack.

Various devices are known to assist in positioning and organizing cables in a housing structure. One example is disclosed in U.S. Pat. No. 8,003,890 to Donowho et al. that includes a repositionable spool assembly for cable routing. The device includes a mounting bracket with a mounting plate. The spool has a base with a stub, cylindrical shaft extending from the base and a gate arm perpendicular to the shaft. The shaft has a plurality of spring detents that are received in an opening in the base to attach the shaft to the base and allow rotation of the shaft with respect to the base.

While the prior devices are generally suitable for their intended purpose, there is a continuing need in the industry for improved devices for cable management.

SUMMARY OF THE INVENTION

The present invention is directed to cable management system for supporting and guiding cables and wires within a housing, cabinet or rack. The invention is particularly directed to a cable management spool for attaching to a spool opening in a rack or in an opening in a mounting member on a rack.

The invention is further directed to a cable management spool that can be coupled to and removed from a mounting member and/or rack in a cable housing or cabinet where the spool is easily attached by inserting the shaft of the spool into an opening and rotating the shaft to a coupling position. The rotation of the spool relative to the rack secures the spool to the rack and/or locks the spool in place.

The spool of the invention has a shaft with at least one and typically two prongs extending from the axial end of the shaft. The prongs can be inserted into a non-circular spool opening in a mounting member such as a mounting plate on a rack. The shaft is rotated so that the prongs engage opposite side edges of the opening to couple the spool within the opening of the mounting member.

In one embodiment of the invention, the mounting member has a spool opening with a shape and dimension to complement coupling members on the spool shaft. The spool opening in one embodiment has two circular shaped open portions where the edges of the two circular open portions overlap. A detent on the mounting member extends into the spool opening to define the two substantially circular open portions.

One aspect of the invention is to provide a mounting member for a spool assembly where the mounting member has two overlapping circular open portions where the two open portions are substantially the same size and dimension. In other embodiments, the two overlapping circular spool open portions can be different sizes and different diameters.

Another feature of the invention is to provide a spool having a shaft with a longitudinally extending slot to define two flexible legs. Each leg has a prong for inserting into the spool opening of the mounting member. Each prong has a base extending outwardly for contacting the outer surface of the mounting member when the spool in inserted into the spool opening. A shoulder is spaced from the base and is positioned to engage an inner surface of the mounting member to attach the spool to the mounting member.

The various features of the invention are basically attained by providing a spool assembly for supporting cables or wires and a cable management system where the spool assembly comprises a mounting member and a spool. The mounting member is positioned in a cable management system, such as a rack or cabinet, and has a spool opening. The spool has a shaft with a longitudinal dimension, a first longitudinal end and a second longitudinal end. A first prong and a second prong extend axially from the first longitudinal end and are configured to be received in the spool opening. Each prong has an outwardly extending base configured for contacting a first side of the mounting member and an outwardly extending shoulder configured for contacting a second side of the mounting member. The spool is rotatable between a first position where the spool can be inserted into an opening in the mounting member and removed from the mounting member and a second position where the spool is retained in the mounting member.

The features of the invention are further attained by providing a cable management system comprising at least one mounting member and a plurality of cable spools. The mounting member is mounted in the cable housing and has a plurality of spaced apart spool openings. The spools are received in the corresponding spool opening in the mounting member. Each of the spools has a shaft with a first longitudinal end and a second longitudinal end, a first prong and a second prong extending axially from the first longitudinal end. Each prong has an outwardly extending base configured for contacting a first surface of the mounting member and an outwardly extending shoulder configured for contacting a second surface of the mounting member. The shoulder of each prong has a dimension to pass through the spool opening when the spool is in a first position and to be retained in the spool opening when the spool is rotated to a second position.

The features of the invention are also provided by a spool assembly for supporting cables comprising a mounting member and a spool. The mounting member has a spool opening. The spool opening has a longitudinal dimension with a transverse dimension and a detent projecting into the spool opening dividing the longitudinal dimension into a first open portion and a second open portion. The spool has a shaft with a longitudinal dimension with a longitudinal axis. A first prong and a second prong extend axially from an end of the shaft. Each prong has a base configured for contacting a first face of the mounting member and has a dimension greater than the transverse dimension of the spool opening. Two prongs extend axially from the shaft. Each prong has an outwardly extending shoulder configured for contacting a second face of the mounting member.

These and other features of the invention will become apparent from the following detailed description of the invention, which in conjunction with the annexed drawings disclose various embodiments of the invention.

BRIEF DESCRIPTION OF THE DRAWINGS

The following is a brief description of the drawings, in which:

FIG. 4 is side view of the spool in one embodiment;

FIG. 5 is an end view of the spool shown from the right side of FIG. 4;

FIG. 6 is a perspective view of the spool of FIG. 4;

FIG. 7 is a top view of the spool as shown from the left side of FIG. 4;

DESCRIPTION OF THE INVENTION

Figure 1:
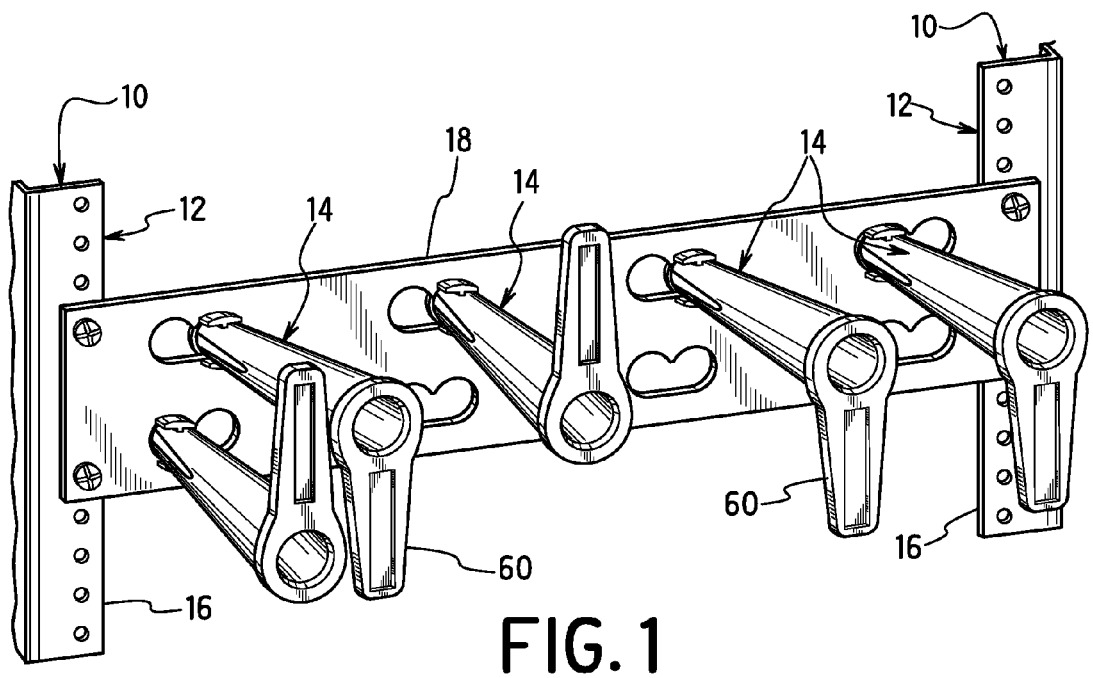
FIG. 1 is a partial elevational view of a cable management assembly in one embodiment of the invention showing the rack with a horizontal mounting plate and spool.

The present invention is directed to cable management system for positioning and guiding cables and/or wires in a rack or cabinet. The invention is particularly directed to a cable management assembly having a spool that is inserted into a non-circular spool opening in a mounting member for supporting the spool.

The invention is also directed to a cable management assembly having a spool received in a non-circular spool opening provided in a cable mounting rack. The spool opening can be formed in the rack or in a mounting plate that can be attached and coupled to the rack in a suitable location and orientation for supporting and guiding cables and wires in the assembly. The cables can be electrical cables, data cables, optical fiber cables or other cables as known in the art.

Referring to the drawings, the spool assembly and cable management assembly 10 includes a cable rack 12 and a spool 14. The rack 12 forms a support assembly for cables and wiring as known in the art. In the embodiment shown, the rack 12 includes a vertical frame 16 and a mounting member 18 for supporting the spool 14. In the embodiment shown in FIG. 1, the mounting member 18 is a substantially planar mounting plate coupled to the frame 16 and extending between two opposing frame members. In the embodiment shown in FIG. 2, the vertical frame defines the mounting member for supporting the spools.

Figure 2:
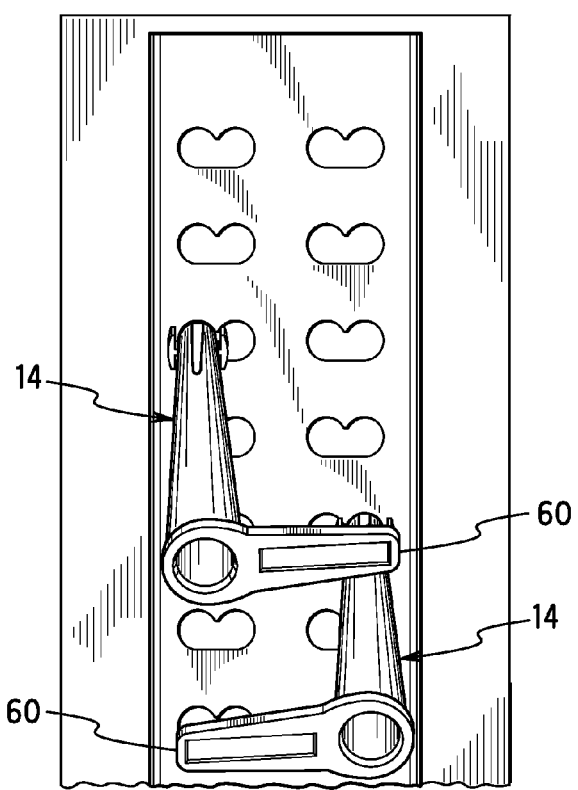
FIG. 2 is partial front view of the cable management assembly showing a vertical mounting plate and spool.
Figure 3:
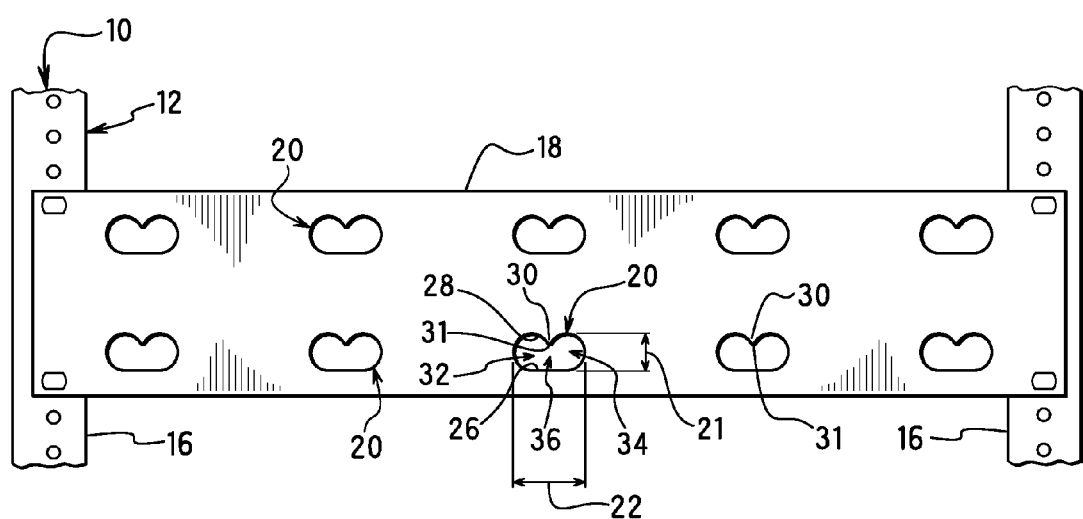
FIG. 3 is a front view of the mounting plate showing the spool openings.

The mounting member 18 for supporting the spools 14 includes a plurality of spaced apart spool openings 20 having a dimension for receiving and supporting the spool 14. In the embodiment shown in FIG. 3, the spool openings 20 having a longitudinal dimension 22 and a transverse dimension 24. The longitudinal dimension 22 is greater than the transverse dimension 24 to define an elongated non-circular spool opening. The spool openings 20 are oriented in the mounting member 18 in the form of rows and columns. In the embodiment shown, the spool openings 20 are aligned so that the spools 14 can be aligned or staggered as shown in FIG. 1 and FIG. 2. As shown in FIG. 1 the spool openings 20 are vertically aligned with respect to the rack and the mounting member.

In the embodiment shown, the spool opening 20 has a first longitudinal edge 26 that has a substantially rectilinear configuration forming a flat, straight side edge of the spool opening 20. The second longitudinal edge 28 is formed opposite the first longitudinal edge 26. A detent 30 extends from the second longitudinal edge 28 toward the first longitudinal edge 26 to form two adjacent overlapping circular open portions 32 and 34. The open portions 32 and 34 have a substantially arcuate or semicircular shaped edge along the second longitudinal edge 28 and form semicircular end edges of the spool opening 20. Each open portion 32 and 34 has a dimension to receive the spool 20.

The semicircular edges extend from the detent 30 to the first longitudinal edge 26 so that each of the open portions has an arcuate, substantially circular configuration with overlapping portions. As shown, each of the open portions 32 and 34 are contiguous and have a perimeter that overlaps in a central area of the spool opening. The first longitudinal edge 26 extends tangentially from the semicircular edges of the open portions 32 and 34. The overlapping open portions 32 and 34 have a dimension to receive the spool 14 for mounting the spool to the mounting member 18. The distal end 31 of the detent 30 is spaced from the first longitudinal side edge 26 to define a gap 36 with a dimension to enable the coupling end of the spool 14 to slide or snap through the gap 36 between the open portions 32 and 34.

The spool 14 as shown in FIGS. 4-7 has a longitudinal shaft 38 with a first end 40 and a second end 42. The shaft 38 has a length and diameter sufficient to support the wires and cables. The length of the shaft 38 can vary depending on the intended use and number or size of cables and wires to be supported. By way of example only, the shaft can have a length of about 3-7 inches. As shown in the drawings, the shaft 38 is tapered toward the first end 40 to form a substantially frustoconical shape.

The first end 40 has a coupling member 44 for coupling with the spool opening 20. The coupling member 44 is defined by prongs 46 having a tapered outer edge 48 converging toward a distal end. A base 50 extends radially outward from each prong 46 for contacting the face of the mounting member 18. As shown, the base 50 of each prong extends outwardly a distance greater than the transverse dimension of the spool opening. A shoulder 52 is spaced from the base 50 and extends outwardly from each prong substantially parallel to the base 50. The base 50 and the shoulder 52 are spaced apart a distance to form a recess corresponding substantially to the thickness of the mounting member 18. The shoulder 52 extends outwardly a distance greater than the transverse dimension 24 and a distance less than the longitudinal dimension of the spool opening so that the shoulder 52 can pass through the spool opening 20 when the shoulders 52 are aligned in the longitudinal dimension of the spool opening.

In the embodiment shown, the shaft 38 has a longitudinally extending slot 54 defining a first flexible leg 56 and a second flexible leg 58. Each prong 46 extends from the distal end of the respective flexible legs so that the prongs are biased outwardly and can deflect radially inwardly toward each other during insertion into and rotation in the spool opening 20. An arm 60 extends from the second longitudinal end 42 of the shaft 38 in a direction substantially perpendicular to the longitudinal axis of the shaft 38. The arm 60 has a length and width for retaining the cables and wires in the desired location.

Figure 8:
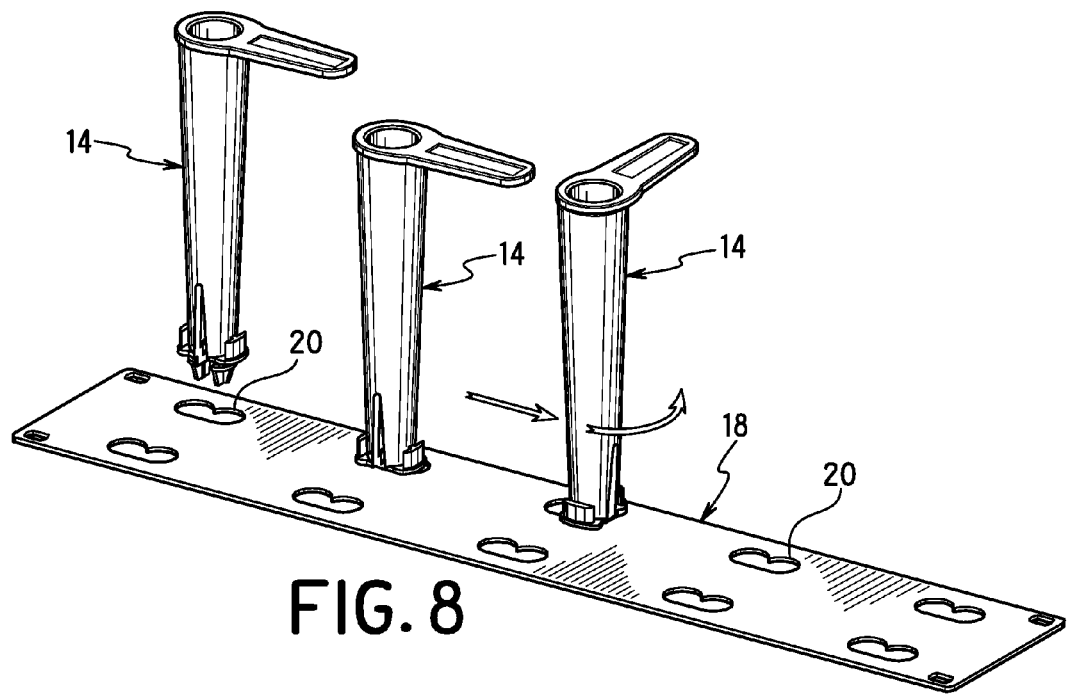
FIG. 8 is a perspective view showing the insertion and coupling of the spool to the mounting plate.
Figure 9:
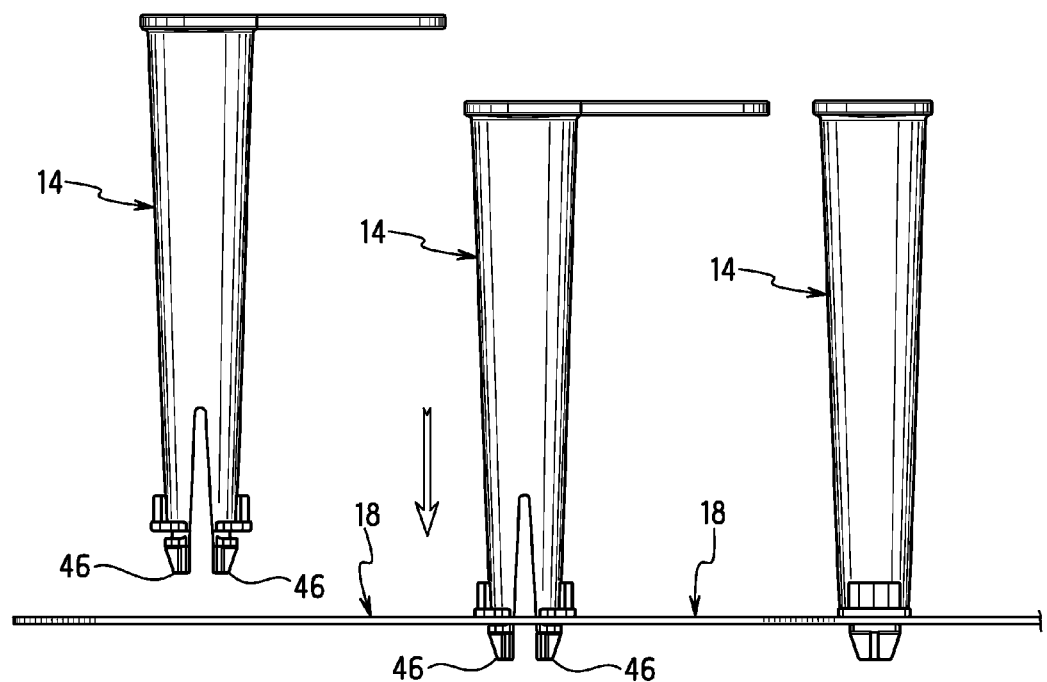
FIG. 9 is a side view showing the insertion of the spool.

The prongs 46 in the rest position are spaced outwardly a distance slightly greater than the transverse dimension of the open portions 32 and 34 of the spool opening 20. As shown in FIG. 8, the prongs 46 are inserted into the spool opening 20 with the prongs 46 aligned in the longitudinal dimension 22 of the spool opening 20 so that each of the prongs 46 are received in the respective open portion 32 and 34. In the embodiment shown, the detent 30 is oriented within the slot 54 between the prongs and the legs of the shaft 38 when the spool 14 is initially inserted into the opening 20. The spool 14 is manually slid to one of the open portions 32 and 34 in the longitudinal dimension of the spool opening 20. The spool 14 is then rotated about the longitudinal axis of the shaft 38 to the position shown in FIG. 10 and FIG. 11 where the base 52 engages a first front face of the mounting member 18 and the shoulder 50 to engage a second rear face of the mounting member 18 to secure the spool in place. The prongs 46 are biased outwardly by the flexible legs to engage the edges of the spool opening 20 to attach the spool 14 in the opening 20. The spool 14 is positioned by the installer in the selected open portion 32 and 34 depending on the desired location of the spool relative to the mounting member 18 and the rack. As shown in the left side of FIG. 1, the spools can be inserted in the selected open portion 32 and 34 to stagger the spools and prevent interference from each other.

Figure 10:
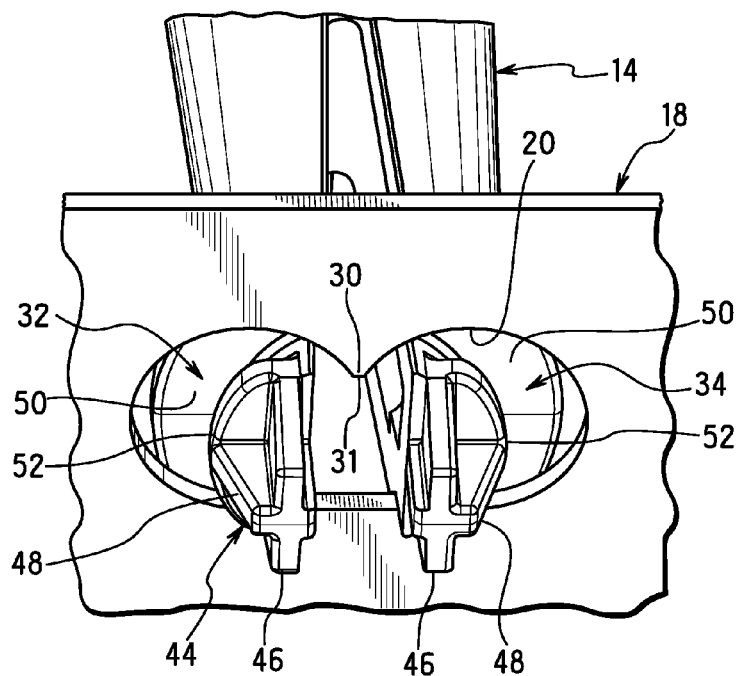
FIG. 10 is a bottom view of the mounting plate showing the spool inserted into the spool opening.
Figure 11:
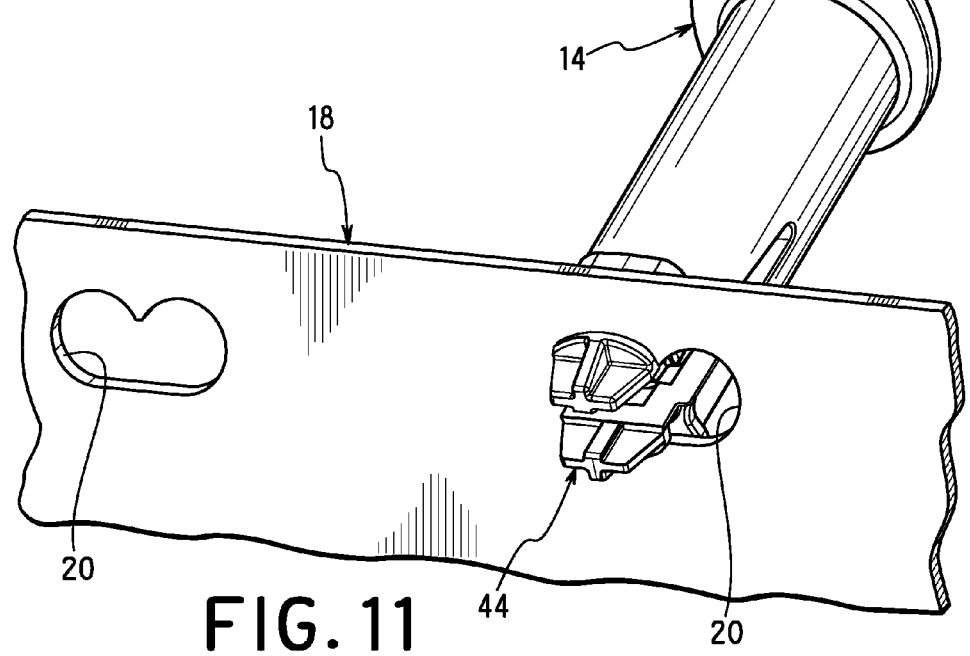
FIG. 11 is a bottom perspective view of the mounting plate showing the spool moved to the coupling position.
Figure 12:
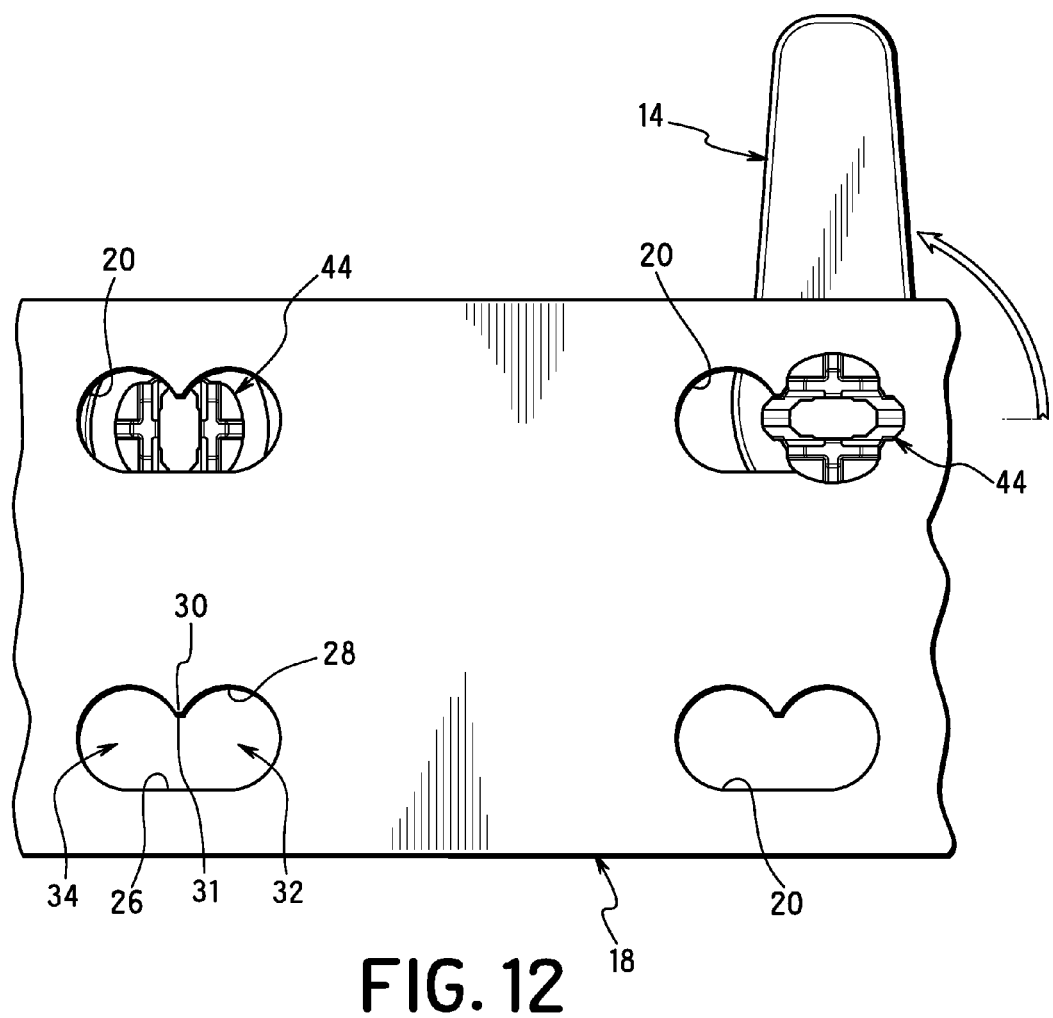
FIG. 12 is a bottom view of the mounting plate showing the spool rotated to the coupling position.

The circular shape of the open portions 32 and 34 enable the spool 14 to be manually rotated about the axis of the shaft 38 for adjustment and positioning as needed. The detent 30 extends into the spool opening 20 a distance to retain the coupling 44 of the spool within the respective open portion 32 and 34 while allowing rotational adjustment of the spool. The spool 14 can be locked in place by rotating the spool within the selected open portion 32 and 34 to position the shaft 38 and the arm 60 is a selected position and orientation relative to the mounting member 18 and/or the rack. The spool 14 can be removed by rotating the spool so that the prongs 46 are aligned with the longitudinal dimension of the spool opening 20 as shown in FIG. 10 and sliding the spool in a longitudinal direction so that the prongs are aligned in a respective open portion 32. At that time, the prongs can be pulled outwardly from the spool opening to disengage from the mounting member. The spool can then be positioned in another location. As shown, the prongs have a width to slide between the gap formed between the end of the detent and the first longitudinal side edge.

Figure 13:
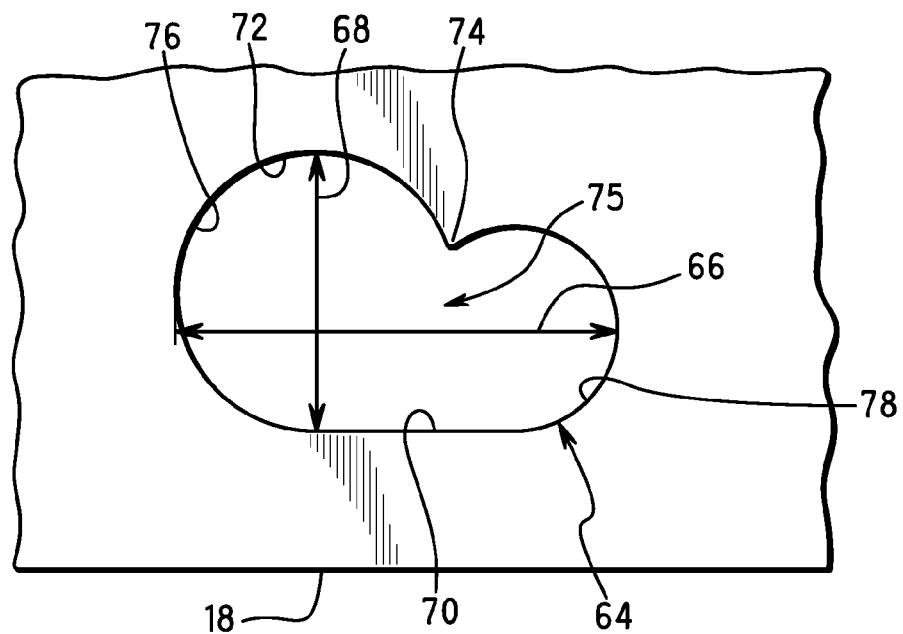
FIG. 13 is front view showing another embodiment of the spool opening.

In the embodiment shown in FIGS. 1-12, the spool opening 20 is defined by open portions 32 and 34 that are substantially the same size and dimension. In another embodiment shown in FIG. 13, the spool opening 64 has a longitudinal dimension 66 and a transverse dimension 68 with the longitudinal dimension being greater than the transverse dimension. The spool opening has a first longitudinal side edge 70 that defines a substantially rectilinear straight edge. A second longitudinal edge 72 includes a detent 74 extending into the spool opening 64 toward the first longitudinal edge 70 to form a gap 75. The detent 74 forms a first open portion 76 and a second open portion 78. As shown in FIG. 13, the first open portion 76 has a substantially circular configuration with a diameter greater than a diameter of the second open portion 78. In this manner, the first open portion 76 has a larger area and dimension than the area and dimension of the second open portion 78. In use, the prongs of the spool are inserted into the first open portion 76 so that the prongs slide easily into the spool opening 64. The spool is then manually slid toward the second open portion 78 in the longitudinal dimension of the spool opening 64. The spool can then be rotated about the longitudinal axis to adjust the position of the spool relative to the spool opening. The spool is removed by rotating the spool so that the prongs are aligned in the longitudinal dimension of the spool opening and sliding the prongs toward the larger first open portion 76.

Figure 14:
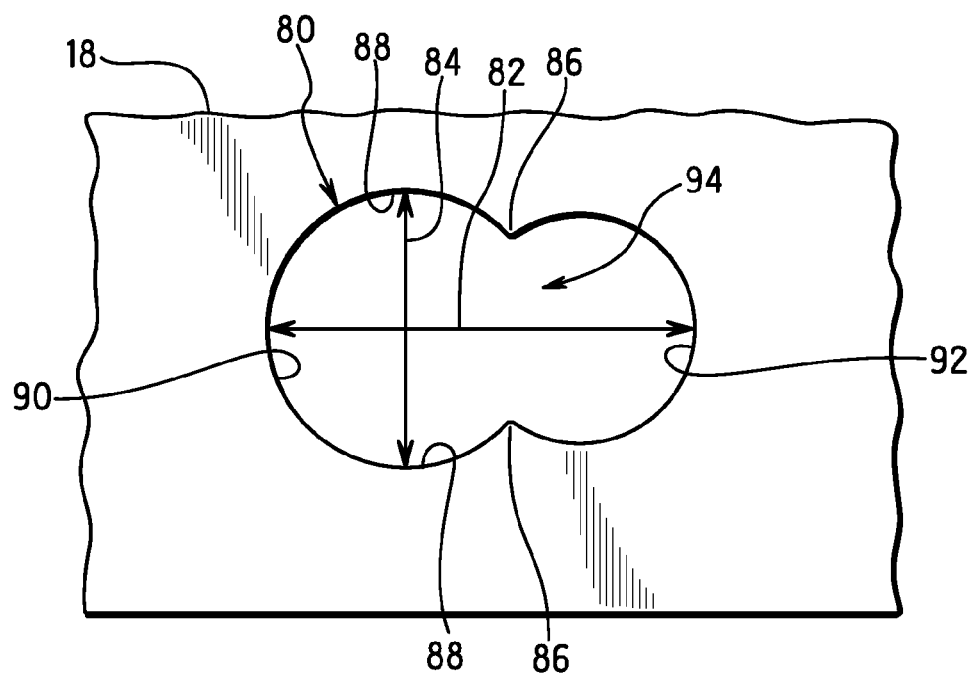
FIG. 14 is a front view showing a further embodiment of the spool opening.

In another embodiment shown in FIG. 14, the spool opening 80 has longitudinal dimension 82 and a transverse dimension 84 where the longitudinal dimension is greater than the transverse dimension. In this embodiment, a detent 86 extends from each of the longitudinal edges 88 of the spool opening 82 define a first substantially circular open portion 90 and a second substantially circular open portion 92 and a gap 94 between the detents 86. In the embodiment shown, the first open portion 90 has a substantially circular configuration with a diameter larger than the diameter of the second portion 92 and where the center axis of the first open portion 90 and the second open portion 92 are aligned with the longitudinal dimension of the spool opening 80. In use, the prongs of the spool are inserted into the first open portion 90 with the prongs aligned in the longitudinal dimension of the spool opening 80. The spool is manually slid in the longitudinal direction toward the second open portion 92 and rotated to the desired position so that the base and shoulder engage the surfaces of the mounting member. The detents 86 extending into the open portion a distance to retain the prongs of the spool within the second open portion while allowing rotational adjustment with respect to the mounting member.

While certain embodiments have been chosen to illustrate the invention, it will be understood that the invention is not limited to the embodiments shown and described herein.

What is claimed is:

1. A spool assembly for supporting a cable in a cable management assembly, said spool assembly comprising:
   a mounting member in the cable management assembly having a spool opening, said spool opening having a longitudinal dimension greater than a transverse dimension of said spool opening; and
   a spool having a shaft with a longitudinal axis, a first longitudinal end and a second longitudinal end, a first prong and a second prong extending axially in said longitudinal axis from said first longitudinal end and received in said spool opening; each said prong having an outwardly, radially extending base configured for contacting a first side of said mounting member and an outwardly extending shoulder configured for contacting a second side of said mounting member, said spool being rotatable between a first position where said spool is removable from said spool opening and a second position where said spool is retained in said spool opening of said mounting member.

2. The spool assembly of claim 1, wherein
   said mounting member has a detent extending transversely into said spool opening to define a first open portion having a first dimension, and a second open portion having a second dimension, each said open portion having a dimension to receive said first and second prongs and enable rotation of said prongs in the respective open portion.

3. The spool assembly of claim 2, wherein
   said detent extends in a transverse direction with respect to said spool opening to define a transverse dimension between said detent and an opposing edge of said spool opening that is less than a transverse dimension of said first open portion and less than a transverse dimension of said second open portion.

4. The spool assembly of claim 3, wherein
   said first open portion of said spool opening has a first substantially circular shape and said second open portion has a second substantially circular shape, where a perimeter of said first open portion and second open portion overlap in a central area of said spool opening.

5. The spool assembly of claim 4, wherein
   said first open portion has a diameter substantially equal to a diameter of said second open portion.

6. The spool assembly of claim 4, wherein
   said first open portion has a diameter greater than a diameter of said second open portion.

7. The spool assembly of claim 1, wherein
   said shaft has a slot extending from said first longitudinal end and defines a first flexible leg and a second flexible leg, said first prong extends from an axial end of said first leg and said second prong extends from an axial end of said second leg.

8. The spool assembly of claim 1, wherein
   each prong has a tapered end converging from the shoulder to the axial end of said prong.

9. The spool assembly of claim 1, wherein
   said base of each prong has a dimension to extend radially outward from said prong a distance greater than an outer surface of said shaft and a distance greater than the transverse dimension of said spool opening.

10. The spool assembly of claim 1, further comprising
    an arm extending radially outward with respect to the longitudinal axis of the shaft.

11. A cable management assembly comprising:
    at least one mounting member mounted in a cable housing, said mounting member having a plurality of spaced apart spool openings, each of said spool openings having a longitudinal dimension greater than a transverse dimension of said spool openings, a detent extending in a transverse direction with respect to said spool opening to define a gap between a first open portion and a second open portion, each said open portion having a dimension to receive the spool, and said gap having a transverse dimension less than a transverse dimension of said first open portion and said second open portion; and
    a plurality of cable spools received in a corresponding spool opening, each said cable spool having a shaft with a first longitudinal end and a second longitudinal end, a first prong and a second prong extending axially from said first end in a longitudinal dimension of said shaft and being biased outwardly, each prong having an outwardly, radially extending base configured for contacting a first surface of said mounting member and an outwardly extending shoulder configured for contacting a second surface of said mounting member, said shoulder of each prong having a transverse dimension to pass through said first open portion and said second open portion of said spool opening when said spool is in a first position and retained in said spool opening when said spool is in a second position.

12. The cable management assembly of claim 11, wherein
    said first open portion and said second open portion of said spool opening having a substantially circular configuration.

13. The cable management assembly of claim 12, wherein
    said first open portion and said second open portion have a substantially equal dimension.

14. The cable management assembly of claim 12, wherein
    said first open portion has a dimension greater than a dimension of said second open portion.

15. A spool assembly for supporting cables comprising:
    a mounting member having a spool opening, said spool opening having a longitudinal dimension and a transverse dimension, and a detent projecting into said spool opening dividing said longitudinal dimension into a first open portion and a second open portion, said detent defining a gap between said first open portion and said second open portion and having a transverse dimension less than a transverse dimension of said first open portion and said second open portion; and
    a spool having a shaft with a longitudinal dimension with a longitudinal axis, a first prong and a second prong extending axially from said shaft in a longitudinal dimension of said shaft, each prong having a base configured for contacting a first face of said mounting member and having a dimension greater than the transverse dimension of said spool opening, and an outwardly, radially extending shoulder configured for contacting a second face of said mounting member, said shoulder having a dimension less than a transverse dimension of said first open portion and less than a dimension of said second open portion.

16. The spool assembly of claim 15, wherein
    said first open portion and said second open portion of said spool opening have substantially the same dimensions.

17. The spool assembly of claim 15, wherein
    said first open portion has a dimension greater than said second open portion.

18. The spool assembly of claim 15, wherein
    said spool opening has a first side edge extending in said longitudinal dimension, said first side edge having a substantially rectilinear shape, and where said detent extends from a second side edge of said spool opening toward said first side edge.

19. The spool assembly of claim 4, wherein
said shoulder of each said prong has a dimension less than said transverse dimension of between said detent and said opposing edge, whereby said shoulders pass through said first open portion and said second open portion when the transverse dimension of said shoulders are aligned with the transverse dimension of said first open portion and said second open portion.

20. The cable management assembly of claim 11, wherein
said shoulder has a first longitudinal dimension extending radially outward from said prong and a second transverse dimension, wherein said second transverse dimension is substantially the same as a transverse dimension of said prong.

* * * * *